(12) United States Patent
Dobschal et al.

(10) Patent No.: US 7,796,329 B2
(45) Date of Patent: Sep. 14, 2010

(54) SIGHTING DEVICE

(75) Inventors: Hans-Jürgen Dobschal, Kleinromstedt (DE); Jörn Greif-Wüstenbecker, Vienna (AT); Stephan Albrecht, Giessen (DE)

(73) Assignees: Carl Zeiss AG, Oberkochen (DE); Carl Zeiss Sports Optics GmbH, Wetzlar (DE)

( * ) Notice: Subject to any disclaimer, the term of this patent is extended or adjusted under 35 U.S.C. 154(b) by 0 days.

(21) Appl. No.: 12/222,406

(22) Filed: Aug. 8, 2008

(65) Prior Publication Data

US 2009/0051989 A1 Feb. 26, 2009

(30) Foreign Application Priority Data

Aug. 8, 2007 (DE) .................. 10 2007 037 389

(51) Int. Cl.
*G02B 23/00* (2006.01)
*F41G 1/00* (2006.01)

(52) U.S. Cl. ........................ 359/399; 359/1; 359/566; 42/132

(58) Field of Classification Search ......... 359/399–428, 359/558–576, 618, 629–630
See application file for complete search history.

(56) References Cited

U.S. PATENT DOCUMENTS

| 5,483,362 | A | * | 1/1996 | Tai et al. | ........................ | 359/1 |
|---|---|---|---|---|---|---|
| 5,835,263 | A | * | 11/1998 | Dobschal | ..................... | 359/369 |
| 5,864,326 | A | * | 1/1999 | Rallison | ......................... | 345/7 |
| 6,490,060 | B1 | | 12/2002 | Tai et al. | | |
| 6,825,987 | B2 | * | 11/2004 | Repetto et al. | .............. | 359/633 |
| 7,069,685 | B2 | | 7/2006 | Houde-Walter | | |
| 7,145,703 | B2 | | 12/2006 | Sieczka et al. | | |
| 7,231,721 | B2 | * | 6/2007 | Minica et al. | ................. | 33/265 |
| 2002/0171939 | A1 | * | 11/2002 | Song | .......................... | 359/630 |
| 2006/0092507 | A1 | | 5/2006 | Menges et al. | | |

FOREIGN PATENT DOCUMENTS

DE 100 46 878 2/2002

OTHER PUBLICATIONS

German Office Action (Translation into English).

* cited by examiner

*Primary Examiner*—Thong Nguyen
(74) *Attorney, Agent, or Firm*—Walter Ottesen

(57) ABSTRACT

A sighting device couples a sight mark into a viewing beam path and is especially for a handheld weapon (2), a bow or a pump gun. The sighting device includes an optical component (6) having a first optical coupling element (8) for coupling the sight mark from a sight mark source into the component (6) and having a second optical coupling element in the region of the viewing beam path for coupling the sight mark (14) out of the component (6) and into the viewing beam path. The second optical coupling element is configured as a diffractive structure (9). The optical component (6) is configured to be totally reflective for guiding the sight mark beam in the interior of the optical component and is at least partially transmissive for the viewing beam paths in the region of the viewing beam path. In this way, a compact and lightweight illuminated sight is provided.

17 Claims, 4 Drawing Sheets

SIGHTING DEVICE

CROSS REFERENCE TO RELATED APPLICATION

This application claims priority of German patent application No. 10 2007 037 389.0, filed Aug. 8, 2007, the entire content of which is incorporated herein by reference.

FIELD OF THE INVENTION

The invention relates to a sighting device for coupling a sight mark into a beam path. Sighting devices of this kind are especially used in hunting, sport shooting and archery.

BACKGROUND OF THE INVENTION

Illuminated sights and reflex sights, for example, the Zeiss Z-Point, are known which are used on weapons, pistols and hunting bows as an aid for target aiming. Such illuminated sights (also known as illuminated dot sights) can, for example, be provided with a laser diode having a light beam which is reflected to the eye of the observer, for example, via a mirror and at a spherical lens surface. German patent publication 100 46 878 discloses a reflex sight having an LED. U.S. Pat. Nos. 6,490,060; 7,069,685; and, 7,145,703 disclose diffractive sights wherein the beam path, which emanates from a light source, travels to the observer mostly through the air. This beam path is sensitive with respect to contamination and misalignment of individual components with respect to each other.

SUMMARY OF THE INVENTION

It is an object of the invention to provide a compact, lightweight illuminated sight which generates a bright sight mark defined with respect to its form. The beam path, which emanates from the sight light source, is protected against contamination and the components are arranged so as to be stable with respect to each other.

The sighting device of the invention is for coupling a sight mark into a viewing beam path. The sighting device includes: an optical component defining a region at least partially transmissive for the viewing beam traveling along the viewing beam path; a source for providing the sight mark as a sight mark beam; the optical component having a first optical coupling element coupling the sight mark into the optical component; the optical component having a second optical coupling element configured as a diffractive structure and being disposed in the region of the viewing beam path for coupling the sight mark out of the optical component and into the viewing beam path; and, the optical component being totally reflective for guiding the sight mark beam in the interior of the optical component.

An optical arrangement for a sighting device is made possible with which the coupling of a sight mark, which is generated by light, into the existing beam path can be achieved with the least possible use of space because of the use of an optical component wherein the sighting beam path is totally reflectively guided as well as because of the use of the coupling elements. Contamination is avoided because of the totally reflective guidance of the beam. Furthermore, the device can be easily capsulated.

With the aid of a quasi dot-shaped light source, an illuminated dot or a sight mark is generated having a form departing therefrom, for example, a circle, cross or several dots. The quasi dot-shaped light source is, for example, a laser diode or an LED having a diameter of 1 to 500 µm. The sighting should be shown free of parallax at a defined distance (for example, 100 m) that is, the sighting should appear superposed there with the viewed object.

The illuminated sight of the invention permits a pleasing finely structured configuration to be achieved. At the same time, the structural space between the light source and the optic can be configured to be closed off from ambient influences.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
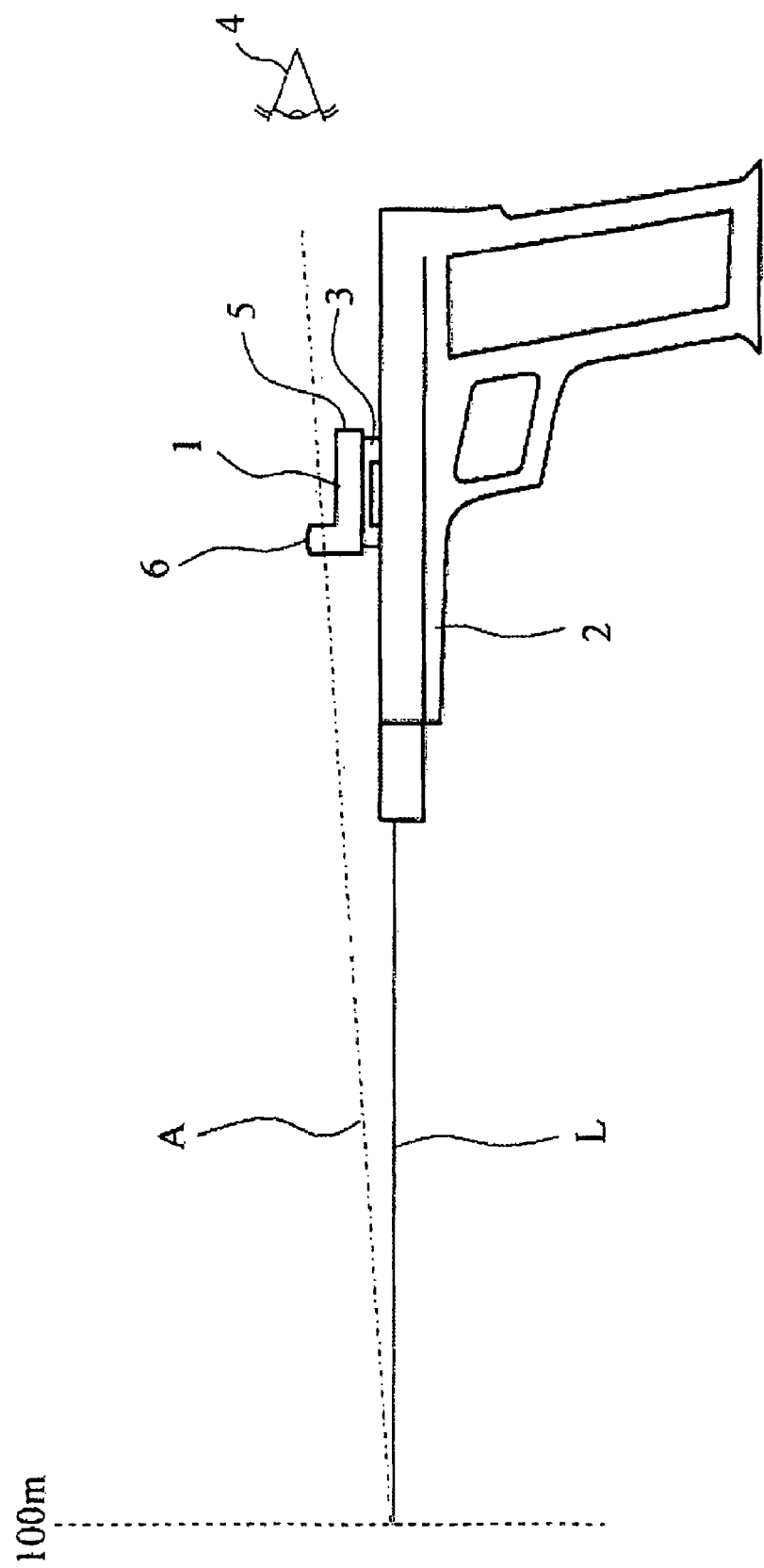
FIG. 1 is a side elevation showing the sighting device on a weapon.

FIG. 1 shows a sighting device 1 according to the invention wherein the sighting device is mounted on a weapon 2 with attachment means 3 in such a manner that the optical axis A of the sighting device 1 runs with respect to the bore axis L of the weapon 2 so that the sighting dot and the meeting point are coincident for the desired distance. The desired distance can, for example, be between 30 m and 300 m, for example, 50 m, 100 m, 200 m or 300 m. The distance here is 100 m and is shown in FIG. 1 by a perpendicular line. A viewer 4 can sight an object, which is disposed at a defined distance, with the sighting device 1. The illuminated sight is operated in see-through. In this embodiment, the illuminated sight is provided with a magnification factor 1. However, also other magnifications can be used especially 0.8 to 4× magnifications. The illuminated sight comprises an at least essentially horizontal base part 5 and a perpendicular part 6 which extends therefrom.

The perpendicular part 6 comprises a body of elongated extent, for example, a rectangular parallelopiped-shaped body, a rod or a plate. Optical glass or plastic glass can be used as materials. The body is suitable for the total reflection of in-coupled light. In the course of the further description, a rectangular parallelopiped-shaped body will be described. However, this body can be replaced with another body of elongated extent.

The rectangular parallelopiped-shaped body 6 is provided with diffractive structures 8 and 9. The diffractive structures 8 and 9 can be configured as holographic optical elements (HOE). They operate as transmission gratings.

Figure 2:
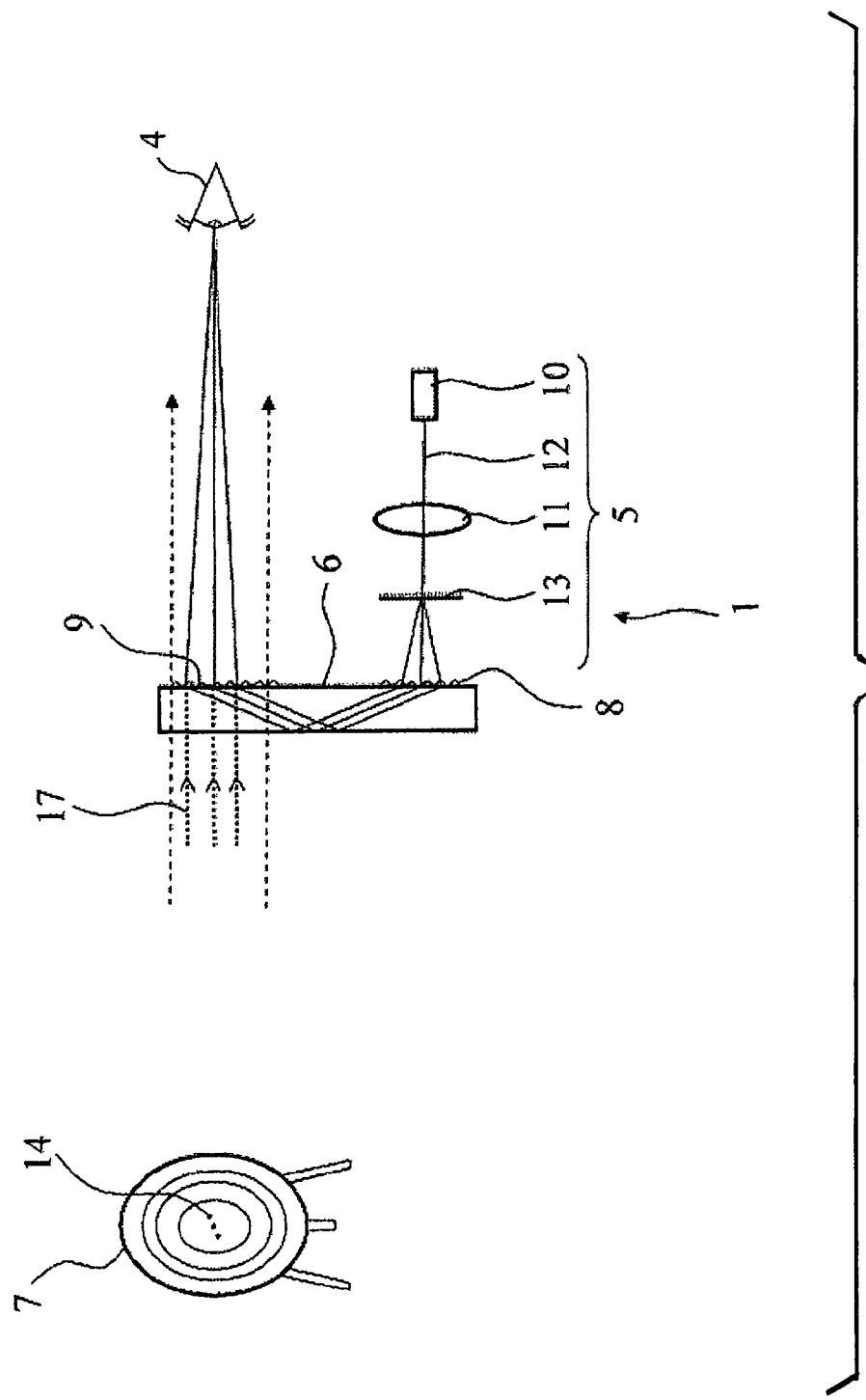
FIG. 2 is a schematic showing the configuration of the sighting device according to an embodiment of the invention.

FIG. 2 shows the schematic configuration of an embodiment of the sighting device 1 of the invention. A viewer 4 can sight an object 7, which is here a target disc, through the perpendicular part 6 of the sighting device 1. The viewing beam path is indicated in FIG. 2 by two dash-line arrows toward the observer 4.

A light source 10 is mounted within the horizontal base part 5. This light source can be arranged in a field plane. Alternatively, an image can be provided as an in-coupling sight mark. The sighting device 1, especially the base part 5, can be provided with a housing.

The light source 10 can be configured as a laser diode. The light source 10 can generate a virtual illuminated dot on the target object 7. Alternatively, other forms can also be provided, for example, a circle, cross, several dots. With a laser diode or a narrow band LED, illuminating densities can be achieved which are suitable for use during the day as well as at twilight with the aid of a manual or automatic control. Typical illuminating intensities amount, for example, to approximately 2 lux up to over 100,000 lux.

The sighting should be shown parallax free at a defined distance of, for example, 100 m, that is, the sighting should superpose there with the object 7 to be observed. Preferably, three dots are imaged in a perpendicular or horizontal arrangement. The diffractive structures 8 and 9 are so designed that the illuminated sight is suitable as a see-through system. The see-through system permits viewing an in-coupled image at the same time as a superposition to the ambient image. For a head mounted display (HMD), in addition to the normal spectacle image of the outside world, an additional image datum is reflected in by means of a splitter element which is arranged just ahead of the spectacles.

A lens 11 collimates the light beam 12, which emanates from the light source 10, to a diffractive structure 13 positioned in a pupil plane 20. This diffractive structure 13 can have a sinusoidal surface structure.

In addition to a zero diffraction order, also the first diffraction order and the minus first diffraction order are generated by this sinusoidal structure which hereinafter is referred to as a sinusoidal grating. The resulting three parallel light beams are coupled by the diffractive structure 8, which is applied to the body 6, into the rectangular parallelopiped-shaped body 6 and are there totally reflected and subsequently leave the body 6 to the observer 4 with the aid of a further diffractive structure 9. The two diffractive structures 8 and 9 are applied as transmission gratings to the body 6. In addition, the diffractive structures 8 and 9 permit the light beam 12 to be coupled in and coupled out at a very steep angle, for example, at 50°. For this reason, the transmission gratings can also be referred to as in-coupling and out-coupling gratings. The optical coupling elements (8, 9) are each bonded to the optical component 6. At least one of the optical coupling elements (8, 9) is configured as a coating on the optical component 6 and at least one of the optical coupling elements (8, 9) is configured as an engraving on the optical component 6.

With the use of conventional mirrors, such high deflection angles would not be possible which would lead to a voluminous construction of the arrangement. The angle is the deflection angle within the body 6. The deflection angle should be so large that total reflection takes place in the body 6 for all field points and wavelengths which occur. The magnitudes of the deflection angles are determined by the selection of the grating constants of the in-coupling grating 8 and out-coupling grating 9.

The light, which is out-coupled by the transmission grating 9, is deflected to the eye of the observer 4 and is shown by three beams. The grating 9 acts as a collimating optic, that is, the illuminated mark (for example, a group of three illuminated dots 14) appears to the viewer to be focused at infinity or, for a closer lying target, appears to be focused correspondingly closer. The observer 4 sees the target as well as the illuminated mark through the diffractive partially-transmissive structure 9 and the rectangular parallelopiped-shaped body 6. For the observer 4, the illuminated mark 14 and the object 7 appear superposed. This is indicated in FIG. 2 by three virtual and therefore dotted arrows 17 toward the observer 4 as well as by the three virtual dots 14. The brightness of the three dots can be controlled by the structural depths of the sinusoidal grating 13 in the different diffraction-orders. If the three dots 14 are to have the same intensity, then the sinusoidal grating 13 must uniformly distribute the incident intensity over the three orders of diffraction. Here, one can assume that the subsequent diffractive structures 8 and 9 exhibit no or only slight angular-dependent intensity efficiencies (diffraction efficiencies) not perceived as being disturbing. The diffraction efficiency of gratings is a function of the wavelength and of the incident angle on the grating. This behavior can be influenced by the selection of the grating profile form.

However, if disturbing angle-dependent intensity efficiencies of the diffractive structures 8 and 9 occur, the sinusoidal grating 13 can be used as a correction member. That is, with a suitable selection of the profile form of the sinusoidal grating 13, a targeted distribution of the diffraction orders (+1, 0, −1) can be achieved which, together with the characteristic of the angle-dependent efficiencies of the diffractive structures 8 and 9 overall results in an at least approximately constant efficiency over the angles or over the diffraction orders. A good efficiency course over the angles of the diffractive structures 8 and 9 can be achieved in this way by means of the sinusoidal grating 13.

The diffractive structures 8 and 9 serve for in-coupling and out-coupling. These diffractive structures 8 and 9 are imaging gratings which provide a pupil-to-pupil imaging. The pupil where the sinusoidal grating 13 stands is imaged into the pupil 21 of the eye. In the present case, the pupil can be formed by the exit surface of the sinusoidal grating 13, that is, in the plane whereat the splitting takes place into the three orders of diffraction. The three beam paths can leave this plane as respective parallel beams. By means of the diffractive structures 8 and 9, it can be achieved that this plane is imaged onto the pupil of the eye and, at the same time, that these three beams arrive as parallel beams at the eye whereby they are focused by the eye lens onto the retina. In the case of a correct imaging of the plane of sinusoidal grating 13 onto the eye pupil, it can be achieved that no cropping of the beam path for the +1order and −1order occurs.

Figure 3:
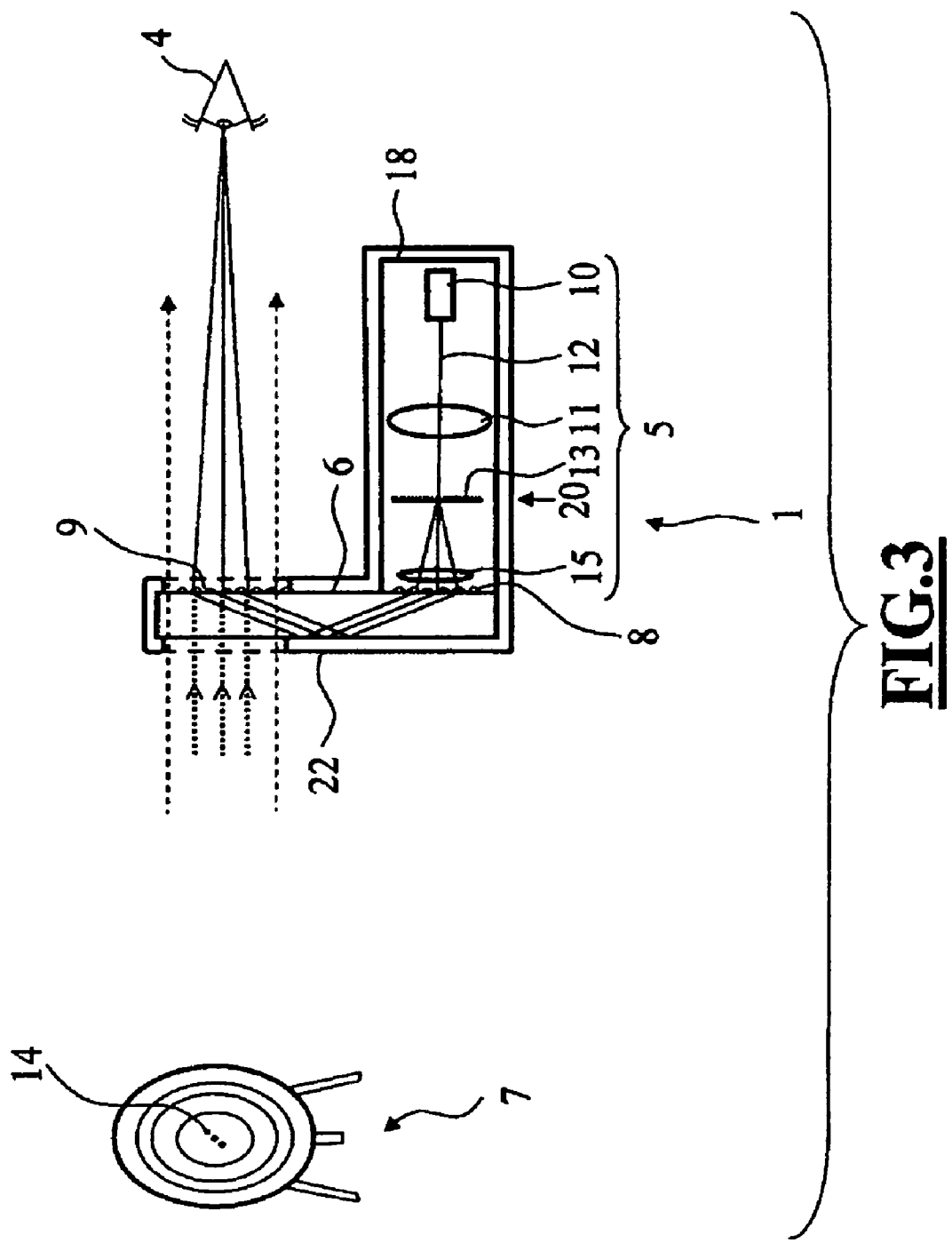
FIG. 3 is a schematic showing a further embodiment of the sighting device of the invention; and, FIG. 4 is a schematic showing still another embodiment of the sighting device of the invention.

In FIG. 3, the diffractive structures 8 and 9 for light in-coupling and light out-coupling exhibit no imaging effect. For this reason, a lens 15 is added which is responsible for the pupil-to-pupil imaging.

A housing 18 is shown. This housing protects against contamination. The rectangular parallelopiped-shaped body 6 can also be accommodated in the housing. Alternatively, the outer walls of body 6 can at least function partially as a housing because of the totally reflective guidance of the light beam 12 in the rectangular parallelopiped-shaped body 6. Such a housing can also be provided in the embodiment of FIG. 2.

In FIGS. 2 and 3, especially the advantage of the diffractive, especially the holographic-optical elements, can be seen. For a mirror with an angle arrangement of 45° for reflecting the light beam from the horizontal part 5 into the perpendicular part 6, the inclined position of the mirror including its mirror thickness needs a relatively large space. This is in contradiction to a configuration as compact as possible. In order to achieve a reduction of the space with classical means, one would have to significantly reduce the size of the mirror which would have the consequences that:

1. the beam diameters of the in-coupling beam paths would have to be significantly shorter than that of the primary beam path; or,
2. the mirror edges would be within the primary beam path which would lead to disturbance effects (scattered light, nonhomogeneous pupil).

Figure 4:
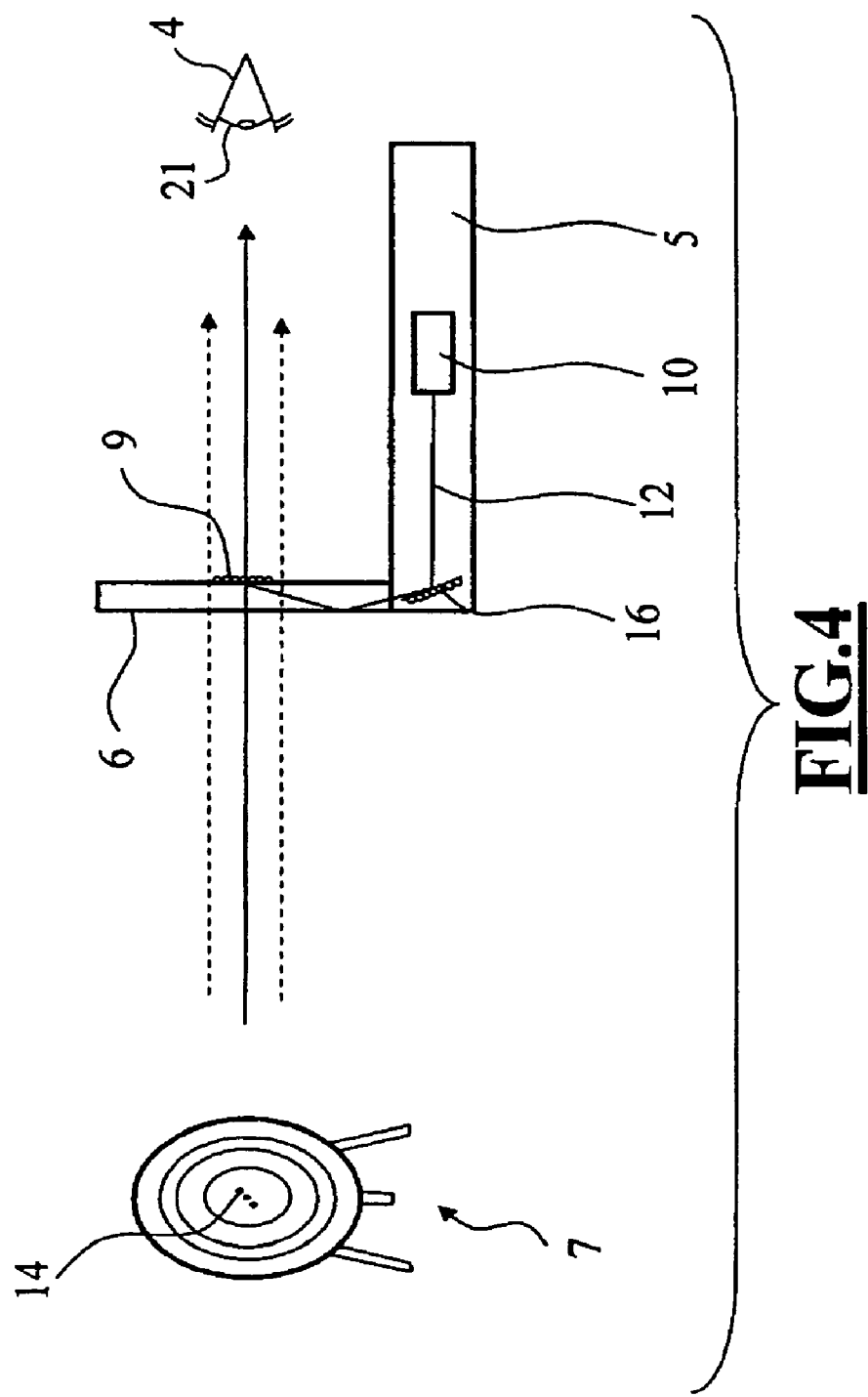

In FIG. 4, an optical element 16 in the form of a mirror or a reflection diffraction grating (for example, an HOE) is arranged in the horizontal part 5 whereby the light beam, which emanates from the light source 10, is reflected to the rectangular parallelopiped-shaped body 6. The body 6 is a glass rod in FIG. 4. With the use of diffractive optics, it is possible to keep the angle of the surface normal of the diffraction grating to the optical axis of the primary light channel so small that a significant reduction of the space requirement can be achieved.

The primary light channel functions for observing the ambient. The primary light channel is indicated in FIGS. 3 and 4 as parallel, horizontal broken-line arrows toward the observer 4. The size of the diffractive element 16 extends, for example, over the width of the entire light channel or beyond so that no edges of the diffractive element 16 run directly through the light channel and, in this way, no scattered light can occur as in the case of a small mirror.

The arrangement of the diffractive structures is not limited to plane-parallel arrangements. It is also conceivable to apply the diffractive structures to curved surfaces. The ambient can also be imaged magnified or demagnified because the illuminated sight is operated in see-through and the diffractive structures are not limited to planar surfaces.

The base part 5 need not be horizontal and the assigned part 6 need not be arranged perpendicularly thereto. Other arrangements are also possible as long as it is ensured that the optical axis A and the bore axis L lie so with respect to each other that the sighting point and the meeting point of the weapon are coincident for the desired distance.

The diffractive elements can be produced holographically, mechanically or digitally. The high deflection angles, especially at the diffractive structures 8 and 9, require a high line number of the grating of approximately >1500 L/mm, that is, the periods of the gratings are <0.7 μm. In order to achieve a high diffraction efficiency, these periods can be once again subdivided preferably into at least four stages. Accordingly, with a step-shaped profile form, the triangular blazing profile form can be approximated which is to be strived for in an ideal case. The structure widths can then be less than <200 nm. To obtain this profile form, holographic arrangements are preferably used. The high grating frequencies are realized by superposing planar waves or spherical waves. For an opposite illuminating arrangement (standing wave process), a triangular-like blazing structure can automatically occur.

It is understood that the foregoing description is that of the preferred embodiments of the invention and that various changes and modifications may be made thereto without departing from the spirit and scope of the invention as defined in the appended claims.

LIST OF REFERENCE NUMERALS

1. Sighting device
2. Weapon
3. Attachment means
4. Observer
5. Horizontal base part
6. Perpendicular part
7. Object
8. Diffractive structure, first optical coupling element
9. Diffractive structure, second optical coupling element
10. Light source
11. Collimator lens
12. Light beam
13. Diffractive sinusoidal structure, sinusoidal grating
14. Three dots
15. Lens
16. Optical element.
17. Arrow
18. Housing
A Optical axis A
L Bore axis L

What is claimed is:

1. A sighting device for coupling a sight mark into a viewing beam path, the sighting device comprising:
   an optical component defining a region at least partially transmissive for a viewing beam traveling along said viewing beam path;
   a source for providing said sight mark as a sight mark beam;
   said optical component having a first optical coupling element coupling said sight mark into said optical component;
   said optical component having a second optical coupling element configured as a diffractive structure and being disposed in said region of said viewing beam path for coupling said sight mark out of said optical component and into said viewing beam path;
   said optical component being totally reflective for guiding said sight mark beam in the interior of said optical component;
   said source being configured as a light source or an image source;
   said first optical coupling element being configured as a diffractive structure or a mirror;
   a collimator lens disposed between said source and said first optical coupling element;
   a pupil plane being disposed between said optical component and said collimator lens; and,
   a diffractive sinusoidal structure disposed in said pupil plane and said diffractive sinusoidal structure having a sinusoidally-shaped surface structure applied thereto in order to make possible at least a first order diffraction and a minus first order diffraction in addition to a zero order diffraction for generating three dot-shaped sight marks.

2. The sighting device of claim 1, wherein the brightness of the three dots is dependent upon the structural depth of said sinusoidal structure in said orders of diffraction.

3. The sighting device of claim 1, wherein said light source is configured as a quasi dot-shaped light source.

4. The sighting device of claim 1, wherein at least one of said diffractive structures is configured as a holographic optical element.

5. The sighting device of claim 1, wherein said optical component is monolithically configured as a rectangular parallelopiped-shaped body or as a plate.

6. The sighting device of claim 1, wherein said diffractive structures are configured as imaging gratings to image said pupil plane at said sinusoidal structure into a pupil of the eye of an observer.

7. The sighting device of claim 1, further comprising a lens disposed between said sinusoidal structure and said optical component for a pupil-to-pupil imaging.

8. The sighting device of claim 1, wherein said first optical coupling element is bonded to said optical component.

9. The sighting device of claim 8, wherein said second optical coupling element is bonded to said optical component.

10. The sighting device of claim 9, wherein at least one of said optical coupling elements is configured as a coating on said optical component.

11. The sighting device of claim 9, wherein at least one of said optical coupling elements is configured as an engraving on said optical component.

12. The sighting device of claim 1, further comprising a housing for accommodating said light source and said optical component therein so as to permit said sight mark beam to travel from said light source to said second optical coupling element within said housing.

13. The sighting device of claim 12, wherein said optical component has an outer wall defining at least partially a portion of said housing.

14. The sighting device of claim 1, wherein said sighting device is for a handheld weapon, a bow or a pump gun.

15. The sighting device of claim 1, wherein the sighting device has a magnification of 0.8 to 4.

16. The sighting device of claim 15, wherein said sighting device has a magnification of one.

17. The sighting device of claim 1, further comprising an encapsulated housing accommodating said light source so as to permit said sight mark beam to travel from said light source to said diffractive structure whereat said sight mark beam is coupled out of said encapsulated housing.

* * * * *